(12) United States Patent
Puri et al.

(10) Patent No.: US 11,683,505 B2
(45) Date of Patent: Jun. 20, 2023

(54) METHOD AND A DEVICE FOR PICTURE ENCODING AND DECODING

(71) Applicant: INTERDIGITAL VC HOLDINGS, INC., Wilmington, DE (US)

(72) Inventors: Saurabh Puri, Rennes (FR); Sebastien Lasserre, Thorigné Fouillard (FR); Patrick Le Callet, Le Pallet (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/490,589

(22) PCT Filed: Feb. 21, 2018

(86) PCT No.: PCT/EP2018/054202
§ 371 (c)(1),
(2) Date: Sep. 2, 2019

(87) PCT Pub. No.: WO2018/158117
PCT Pub. Date: Sep. 7, 2018

(65) Prior Publication Data
US 2020/0404296 A1 Dec. 24, 2020

(30) Foreign Application Priority Data
Mar. 2, 2017 (EP) .................................... 17305227

(51) Int. Cl.
*H04N 19/184* (2014.01)
*H04N 19/176* (2014.01)
(Continued)

(52) U.S. Cl.
CPC ......... *H04N 19/184* (2014.11); *H04N 19/176* (2014.11); *H04N 19/18* (2014.11); *H04N 19/44* (2014.11)

(58) Field of Classification Search
CPC .... H04N 19/184; H04N 19/18; H04N 19/176; H04N 19/44
See application file for complete search history.

(56) References Cited

U.S. PATENT DOCUMENTS 9,148,667 B2 * 9/2015 Chien .................. H04N 19/147
9,544,597 B1 * 1/2017 Han ..................... H04N 19/625
(Continued)

FOREIGN PATENT DOCUMENTS

CN  104704833 A  6/2015
CN  102396229 A  3/2021
(Continued)

OTHER PUBLICATIONS

Puri et al., "Annealed Learning Based Block Transforms for HEVC Video Coding", 2016 IEEE International Conference on Acoustics, Speech and Signal Processing (ICASSP), Shanghai, China, Mar. 20, 2016, pp. 1135-1139.
(Continued)

*Primary Examiner* — Nasim N Nirjhar
(74) *Attorney, Agent, or Firm* — Invention Mine LLC

(57) ABSTRACT

A decoding method is disclosed. The decoding method comprises:
 determining an index from a bitstream, the index identifying a coding element in a set of a plurality of coding elements;
 decoding a picture block from the bitstream using the coding element of the set identified by the index.
In a specific embodiment, determining the index comprises:
 determining, for each coding element in the set, a probability that the coding element was used for encoding the picture block; and
 determining the index responsive to the determined probabilities.

17 Claims, 7 Drawing Sheets

(51) Int. Cl.
*H04N 19/18* (2014.01)
*H04N 19/44* (2014.01)

(56) References Cited

U.S. PATENT DOCUMENTS

| | | | |
|---|---|---|---|
| 10,520,579 B2* | 12/2019 | Wirola | H04L 69/04 |
| 2012/0045141 A1* | 2/2012 | Suzuki | H04N 19/18 382/238 |
| 2014/0078250 A1 | 3/2014 | Zhang et al. | |
| 2018/0288406 A1 | 10/2018 | Kouno | |
| 2019/0236411 A1* | 8/2019 | Zhu | G06K 9/6292 |

FOREIGN PATENT DOCUMENTS

| | | | |
|---|---|---|---|
| JP | 2010251946 A | 11/2010 | |
| WO | WO-2015128222 A1 * | 9/2015 | H04N 19/176 |
| WO | WO 2015128222 A1 | 9/2015 | |
| WO | 2016125604 A1 | 8/2016 | |
| WO | 2016180480 A1 | 11/2016 | |
| WO | WO-2018099579 A1 * | 6/2018 | G06N 3/0454 |

OTHER PUBLICATIONS

Arrufat et al., "Mode-Dependent Transform Competition for HEVC", 2015 IEEE International Conference on Image Processing (ICIP), Quebec City, Canada, Sep. 27, 2015, pp. 1598-1602.

Egmont-Petersen et al., "Image Processing with Neural Networks—A Review", Pattern Recognition, vol. 35, No. 10, Oct. 2002, pp. 2279-2301.

Zhao et al, "Video Coding with Rate-Distortion Optimized Transform", IEEE Transactions on Circuits and Systems for Video Technology, vol. 22, No. 1, Jan. 2012, pp. 138-151.

* cited by examiner

METHOD AND A DEVICE FOR PICTURE ENCODING AND DECODING

This application claims the benefit, under 35 U.S.C. §365 of International Application PCT/EP2018/054202, filed Feb. 21, 2018, which was published in accordance with PCT Article 21(2) on Sep. 7, 2018, in English, and which claims the benefit of European Patent Application No. 17305227.5 filed Mar. 2, 2017.

1. TECHNICAL FIELD

The present principles generally relate to a method and a device for picture encoding and decoding and more particularly, to a method and a device for picture encoding and decoding using multiple transforms.

2. BACKGROUND ART

To achieve high compression efficiency, video coding schemes usually employ prediction and transform to leverage spatial and temporal redundancy in the video content. Generally, intra or inter prediction is used to exploit the intra or inter frame correlation, then the differences between group of samples in the original picture and in the predicted picture, often denoted as residuals, are transformed, quantized and entropy coded. To reconstruct the video, the compressed data is decoded by inverse processes corresponding to the prediction, transform, quantization and entropy coding.

Traditional video coding schemes use a fixed transform, e.g. a DCT or a DST. A single transform is not efficient to model different statistical variations that may be present in residuals. Therefore, more recent video coding schemes use multiple transforms. By using multiple transform candidates, an encoder is given the choice to select the transform for a given residual block that provides minimum cost in terms of both rate and distortion. This is usually done using an exhaustive Rate Distortion Optimization (RDO) search in the encoder. An additional syntax element, i.e. an index, is often encoded that identifies the transform selected for the given residual block. Coding such additional syntax element may be costly in terms of bitrate. There is thus a need to encode this syntax element more efficiently.

3. BRIEF SUMMARY

A decoding method is disclosed that comprises:
determining an index from a bitstream, the index identifying a coding element in a set of a plurality of coding elements;
decoding a picture block from the bitstream using the coding element of the set identified by the index;
wherein determining the index comprises:
  determining, for each coding element in the set, a probability that the coding element was used for encoding the picture block; and
  determining the index responsive to the determined probabilities.

A decoding device is also disclosed that comprises:
means for determining an index from a bitstream, the index identifying a coding element in a set of a plurality of coding elements;
means for decoding a picture block from the bitstream using the coding element of the set identified by the index;
wherein the means for determining the index comprises:
  means for determining, for each coding element in the set, a probability that the coding element was used for encoding the picture block; and
  means for determining the index responsive to the determined probabilities.

In a variant, a decoding device is disclosed that comprises a communication interface configured to access a bitstream and at least one process decoding or configured to:
determine an index from the accessed bitstream, the index identifying a coding element in a set of a plurality of coding elements;
decode a picture block from the accessed bitstream using the coding element of the set identified by the index;
wherein to determine the index comprises:
  determine, for each coding element in the set, a probability that the coding element was used for encoding the picture block; and
  determine the index responsive to the determined probabilities.

The following embodiments apply to the decoding method and decoding devices disclosed above.

In a specific embodiment, determining, for each coding element in the set, a probability comprises applying a convolutional neural network model on a version of the picture block.

Advantageously, determining the index responsive to the determined probabilities comprises obtaining a truncated unary code from the bitstream and determining the index from the truncated unary code responsive to the determined probabilities.

Advantageously, determining the index from the truncated unary code responsive to the determined probabilities comprises sorting the indices of the plurality of coding element in a decreasing order of their probability.

In a specific embodiment, obtaining the truncated unary code comprises entropy decoding a part of the bitstream into the truncated unary code.

According to a specific characteristic, the coding element is a transform.

An encoding method is disclosed that comprises:
encoding a picture block in a bitstream using a coding element of a set of a plurality of coding elements;
encoding an index identifying the coding element in the set of a plurality of coding elements in the bitstream;
wherein encoding the index comprises:
  determining, for each coding element in the set, a probability that the coding element was used for encoding the picture block; and
  encoding the index responsive to the determined probabilities.

An encoding device is also disclosed that comprises:
means for encoding a picture block in a bitstream using a coding element of a set of a plurality of coding elements;
means for encoding an index identifying the coding element in the set of a plurality of coding elements in the bitstream;
wherein the means encoding the index comprises:
  means for determining, for each coding element in the set, a probability that the coding element was used for encoding the picture block; and
  means for encoding the index responsive to the determined probabilities.

In a variant, an encoding device is disclosed that comprises a communication interface configured to access a picture block and at least one processor configured to:

encode the accessed picture block in a bitstream using a
coding element of a set of a plurality of coding elements;

encode an index identifying the coding element in the set of a plurality of coding elements in the bitstream;

wherein to encode the index comprises:

determine, for each coding element in the set, a probability that the coding element was used for encoding the accessed picture block; and encode the index responsive to the determined probabilities.

A bitstream representative of picture is disclosed that comprises:

coded data representative of a picture block, the coded data being obtained by using a coding element of a set of a plurality of coding elements;

coded data representative of an index identifying the coding element in the set of a plurality of coding elements;

wherein the coded data representative of an index are obtained by:

determining, for each coding element in the set, a probability that the coding element was used for encoding the picture block; and encoding the index responsive to the determined probabilities.

In a variant, a non-transitory processor readable medium having stored thereon a bitstream is disclosed, wherein the bitstream comprises:

coded data representative of a picture block, the coded data being obtained by using a coding element of a set of a plurality of coding elements;

coded data representative of an index identifying the coding element in the set of a plurality of coding elements;

wherein the coded data representative of an index are obtained by:

determining, for each coding element in the set, a probability that the coding element was used for encoding the picture block; and encoding the index responsive to the determined probabilities.

A transmitting method is disclosed that comprises:

transmitting coded data representative of a picture block, the coded data being obtained by using a coding element of a set of a plurality of coding elements;

transmitting coded data representative of an index identifying the coding element in the set of a plurality of coding elements;

wherein the coded data representative of an index are obtained by:

determining, for each coding element in the set, a probability that the coding element was used for encoding the picture block; and encoding the index responsive to the determined probabilities.

A transmitting device is disclosed that comprises:

means for transmitting coded data representative of a picture block, the coded data being obtained by using a coding element of a set of a plurality of coding elements;

means for transmitting coded data representative of an index identifying the coding element in the set of a plurality of coding elements;

wherein the coded data representative of an index are obtained by:

determining, for each coding element in the set, a probability that the coding element was used for encoding the picture block; and encoding the index responsive to the determined probabilities.

A transmitting device is disclosed that comprises a communication interface configured to access a picture block and at least one processor configured to:

transmit coded data representative of the accessed picture block, the coded data being obtained by using a coding element of a set of a plurality of coding elements;

transmit coded data representative of an index identifying the coding element in the set of a plurality of coding elements;

wherein the coded data representative of an index are obtained by:

determining, for each coding element in the set, a probability that the coding element was used for encoding the accessed picture block; and encoding the index responsive to the determined probabilities.

The following embodiments apply to the coding method, coding devices, bitstream, processor readable medium, transmitting method and transmitting devices disclosed above.

In a specific embodiment, determining, for each coding element in the set, a probability comprises applying a convolutional neural network model on a version of the picture block.

In a specific embodiment, encoding the index responsive to the determined probabilities comprises determining a truncated unary code responsive to the determined probabilities and encoding the index in the form of the truncated unary code.

Advantageously, determining a truncated unary code responsive to the determined probabilities comprises sorting the indices of the plurality of coding element in a decreasing order of their probability.

In a specific embodiment, encoding the index in the form of the truncated unary code comprises entropy encoding the truncated unary code in the bitstream.

According to a specific characteristic, the coding element is a transform.

4. BRIEF SUMMARY OF THE DRAWINGS

5. DETAILED DESCRIPTION

It is to be understood that the figures and descriptions have been simplified to illustrate elements that are relevant for a clear understanding of the present principles, while eliminating, for purposes of clarity, many other elements found in typical encoding and/or decoding devices. It will be understood that, although the terms first and second may be used herein to describe various elements, these elements should not be limited by these terms. These terms are only used to distinguish one element from another.

A picture is an array of luma samples in monochrome format or an array of luma samples and two corresponding arrays of chroma samples in 4:2:0, 4:2:2, and 4:4:4 colour format. Generally, a "block" addresses a specific area in a sample array (e.g., luma Y), and a "unit" includes the collocated block of all color components (luma Y and possibly chroma Cb and chroma Cr). A slice is an integer number of basic coding units such as HEVC coding tree units or H.264 macroblock units. A slice may consist of a complete picture as well as part thereof. Each slice may include one or more slice segments.

In the following, the word "reconstructed" and "decoded" can be used interchangeably. Usually but not necessarily "reconstructed" is used on the encoder side while "decoded" is used on the decoder side. It should be noted that the term "decoded" or "reconstructed" may mean that a bitstream is partially "decoded" or "reconstructed," for example, the signals obtained after deblocking filtering but before SAO filtering, and the reconstructed samples may be different from the final decoded output that is used for display. We may also use the terms "image," "picture," and "frame" interchangeably.

Various embodiments are described with respect to the HEVC standard. However, the present principles are not limited to HEVC, and can be applied to other standards, recommendations, and extensions thereof, including for example HEVC or HEVC extensions like Format Range (RExt), Scalability (SHVC), Multi-View (MV-HEVC) Extensions and H.266.

The various embodiments are described with respect to the encoding/decoding of a picture block. They may be applied to encode/decode a whole picture or a whole sequence of pictures.

Various methods are described above, and each of the methods comprises one or more steps or actions for achieving the described method. Unless a specific order of steps or actions is required for proper operation of the method, the order and/or use of specific steps and/or actions may be modified or combined.

Figure 1:
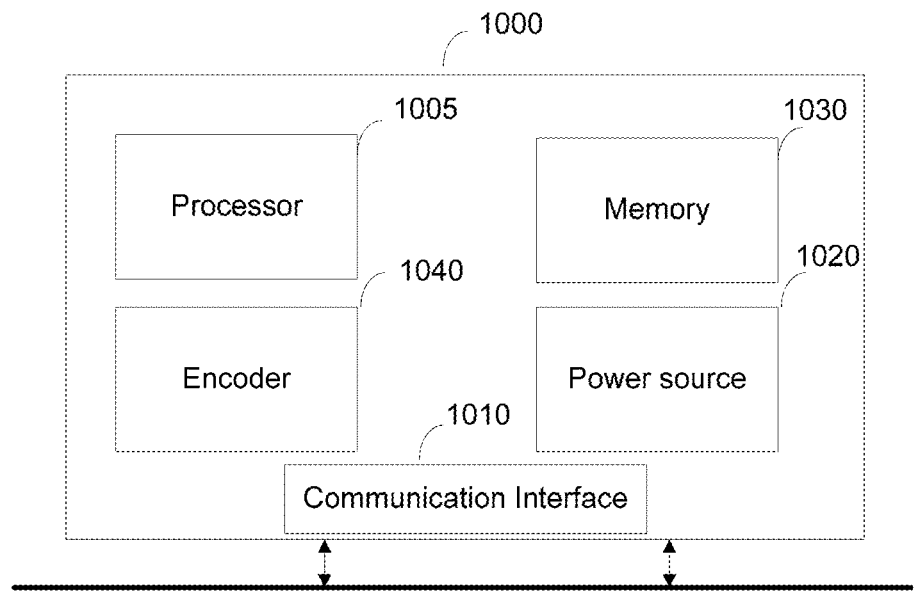
FIG. 1 represents an exemplary architecture of a transmitter configured to encode a picture in a bitstream according to a specific and non-limiting embodiment.

FIG. 1 represents an exemplary architecture of a transmitter 1000 configured to encode a picture in a bitstream according to a specific and non-limiting embodiment.

The transmitter 1000 comprises one or more processor(s) 1005, which could comprise, for example, a CPU, a GPU and/or a DSP (English acronym of Digital Signal Processor), along with internal memory 1030 (e.g. RAM, ROM, and/or EPROM). The transmitter 1000 comprises one or more communication interface(s) 1010 (e.g. a keyboard, a mouse, a touchpad, a webcam), each adapted to display output information and/or allow a user to enter commands and/or data; and a power source 1020 which may be external to the transmitter 1000. The transmitter 1000 may also comprise one or more network interface(s) (not shown). Encoder module 1040 represents the module that may be included in a device to perform the coding functions. Additionally, encoder module 1040 may be implemented as a separate element of the transmitter 1000 or may be incorporated within processor(s) 1005 as a combination of hardware and software as known to those skilled in the art.

The picture may be obtained from a source. According to different embodiments, the source can be, but is not limited to:
- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- a picture capturing circuit (e.g. a sensor such as, for example, a CCD (or Charge-Coupled Device) or CMOS (or Complementary Metal-Oxide-Semiconductor)).

According to different embodiments, the bitstream may be sent to a destination. As an example, the bitstream is stored in a remote or in a local memory, e.g. a video memory or a RAM, a hard disk. In a variant, the bitstream is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network. According to an exemplary and non-limiting embodiment, the transmitter 1000 further comprises a computer program stored in the memory 1030. The computer program comprises instructions which, when executed by the transmitter 1000, in particular by the processor 1005, enable the transmitter 1000 to execute the encoding method described with reference to FIGS. 3, 4 and 6. According to a variant, the computer program is stored externally to the transmitter 1000 on a non-transitory digital data support, e.g. on an external storage medium such as a HDD, CD-ROM, DVD, a read-only and/or DVD drive and/or a DVD Read/Write drive, all known in the art. The transmitter 1000 thus comprises a mechanism to read the computer program. Further, the transmitter 1000 could access one or more Universal Serial Bus (USB)-type storage devices (e.g., "memory sticks.") through corresponding USB ports (not shown). According to exemplary and non-limiting embodiments, the transmitter 1000 can be, but is not limited to:
- a mobile device;
- a communication device;
- a game device;
- a tablet (or tablet computer);
- a laptop;
- a still picture camera;
- a video camera;
- an encoding chip or encoding device/apparatus;
- a still picture server; and
- a video server (e.g. a broadcast server, a video-on-demand server or a web server).

Figure 2:
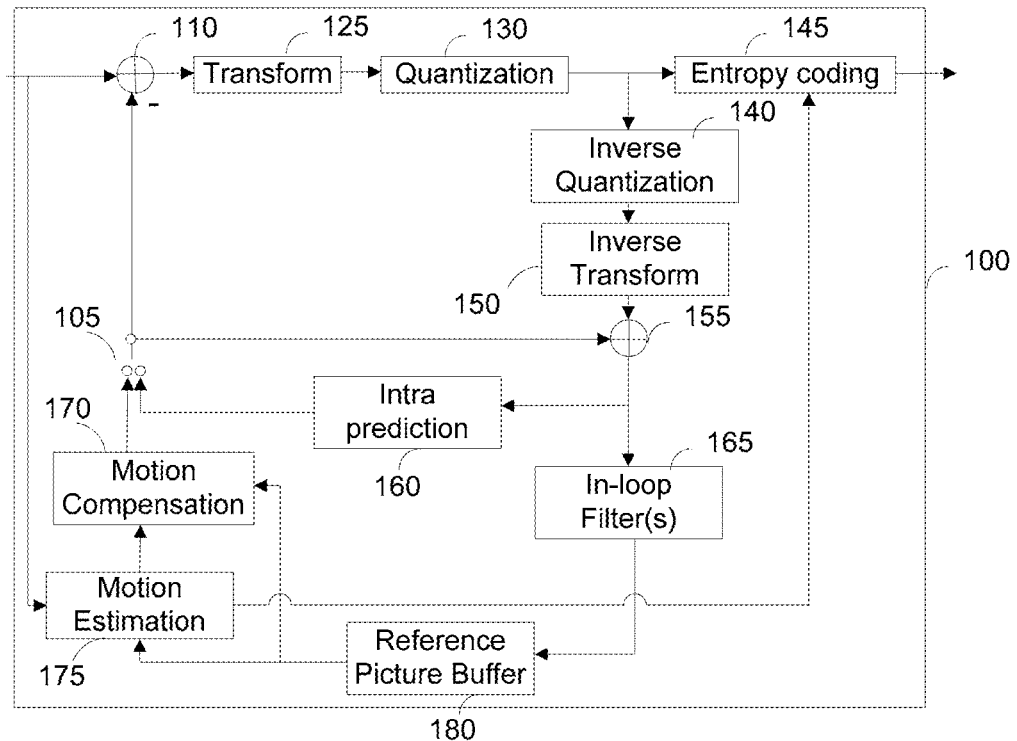
FIG. 2 illustrates an exemplary video encoder.
Figure 3:
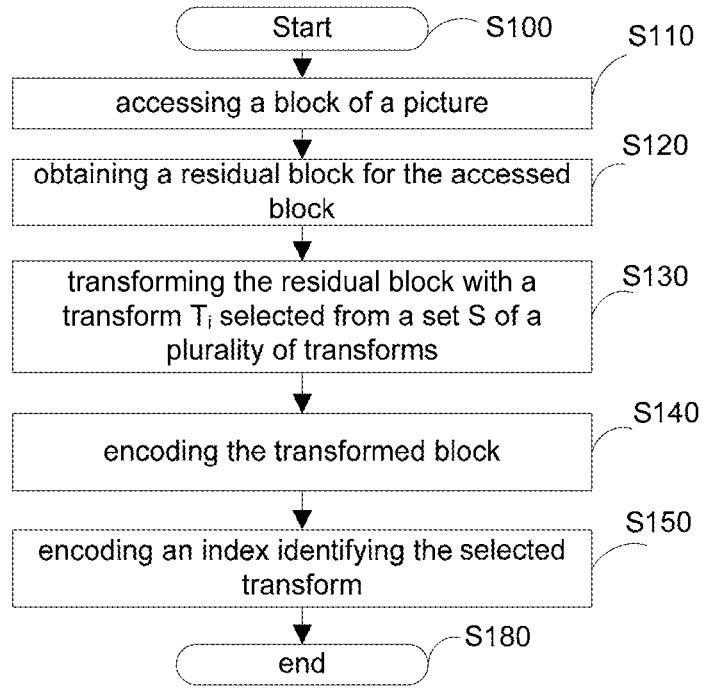
FIGS. 3 and 4 represent flowcharts of a method for encoding a picture block in a bitstream according to a specific and non-limiting embodiment.

FIG. 2 illustrates an exemplary video encoder 100, e.g. a HEVC video encoder, adapted to execute the encoding method of FIG. 3. The encoder 100 is an example of a transmitter 1000 or part of such a transmitter 1000.

For coding, a picture is usually partitioned into basic coding units, e.g. into coding tree units (CTU) in HEVC or into macroblock units in H.264. A set of possibly consecutive basic coding units is grouped into a slice. A basic coding unit contains the basic coding blocks of all color components. Usually, the basic coding blocks are of square shape of $2^n \times 2^n$ samples, where n is an integer, e.g. $n \in \{4, 5, 6\}$. In HEVC, the smallest CTB size 16×16 corresponds to a macroblock size as used in previous video coding standards. It will be understood that, although the terms CTU and CTB are used herein to describe encoding/decoding methods and encoding/decoding apparatus, these methods and apparatus should not be limited by these specific terms that may be worded differently (e.g. macroblock) in other standards such as H.264.

In HEVC, a CTB is the root of a quadtree partitioning into Coding Blocks (CB), and a Coding Block is partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU. In the present application, the term "block" or "picture block" can be used to refer to any one of a CTU, a CU, a PU, a TU, a CB, a PB and a TB. In addition, the term "block" or "picture block" can be used to refer to a macroblock, a partition and a sub-block as specified in H.264/AVC or in other video coding standards, and more generally to refer to an array of samples of various sizes.

In the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Residuals are calculated by subtracting (110) a predicted sample block (also known as a predictor) from the original picture block.

CUs in intra mode are predicted from reconstructed neighboring samples within the same slice. A set of 35 intra prediction modes is available in HEVC, including a DC, a planar and 33 angular prediction modes. The intra prediction reference is reconstructed from the row and column adjacent to the current block. The reference extends over two times the block size in horizontal and vertical direction using available samples from previously reconstructed blocks. When an angular prediction mode is used for intra prediction, reference samples can be copied along the direction indicated by the angular prediction mode.

The applicable luma intra prediction mode for the current block can be coded using two different options. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

For an inter CU, the corresponding coding block is further partitioned into one or more prediction blocks. Inter prediction is performed on the PB level, and the corresponding PU contains the information about how inter prediction is performed. The motion information (i.e., motion vector and reference index) can be signaled in two methods, namely, "advanced motion vector prediction (AMVP)" and "merge mode". In AMVP, a video encoder or decoder assembles candidate lists based on motion vectors determined from already coded blocks. The video encoder then signals an index into the candidate lists to identify a motion vector predictor (MVP) and signals a motion vector difference (MVD). At the decoder side, the motion vector (MV) is reconstructed as MVP+MVD.

In the merge mode, a video encoder or decoder assembles a candidate list based on already coded blocks, and the video encoder signals an index for one of the candidates in the candidate list. At the decoder side, the motion vector and the reference picture index are reconstructed based on the signaled candidate.

In HEVC, the precision of the motion information for motion compensation is one quarter-sample for the luma component and one eighth-sample for the chroma components. A 7-tap or 8-tap interpolation filter is used for interpolation of fractional-sample sample positions, i.e., ¼, ½ and ¾ of full sample locations in both horizontal and vertical directions can be addressed for luma.

The residuals are transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder comprises a decoding loop and thus decodes an encoded block to provide a reference for further predictions. The quantized transform coefficients are de-quantized (140) and inverse transformed (150) to decode residuals. A picture block is reconstructed by combining (155) the decoded residuals and the predicted sample block. An in-loop filter (165) is applied to the reconstructed picture, for example, to perform deblocking/SAO (Sample Adaptive Offset) filtering to reduce coding artifacts. The filtered picture may be stored in a reference picture buffer (180) and used as reference for other pictures.

In HEVC, SAO filtering may be activated or de-activated at video level, slice level and CTB level. Two SAO modes are specified: edge offset (EO) and band offset (BO). For EO, the sample classification is based on local directional structures in the picture to be filtered. For BO, the sample classification is based on sample values. The parameters for EO or BO may be explicitly coded or derived from the neighborhood. SAO can be applied to the luma and chroma components, where the SAO mode is the same for Cb and Cr components. The SAO parameters (i.e. the offsets, the SAO types EO, BO and inactivated, the class in case of EO and the band position in case of BO) are configured individually for each color component.

FIG. 3 represents a flowchart of a method for encoding a picture block in a bitstream according to a specific and non-limiting embodiment. The encoding method is disclosed for the transform but may be extended to various coding elements for which an index identifying the coding element in a set of a plurality of coding elements needs to be signaled to a decoder. The method may thus be extended to the following coding elements:

prediction mode such as intra coding vs. inter coding,
or intra prediction such as the direction of prediction in intra coding,
or Motion Vector (MV) candidates The method starts at step S100. At step S110, a transmitter, e.g. such as the encoder 100, accesses a block of a picture.

At step S120, the transmitter obtains a residual block for the accessed block. The residual block is usually obtained by subtracting a predictor from the accessed block. The predictor may be obtained from the same picture (intra prediction) as the picture to which the accessed block belongs or from another picture (inter prediction).

At step S130, the transmitter transforms the residual block into a transformed block with a transform $T_i$ selected from a set of a plurality of transforms $S=\{T_k, k\in[0, 1, 2, \ldots, N-1]\}$, N being an integer. As an example, N=2 and S comprises a DST (Discrete Sine Transform) and a DCT (Discrete Cosine Transform). The transformed block is a block of transform coefficients. In an optional step, the transformed block is quantized.

At step S140, the transmitter encodes the transformed block possibly quantized. Encoding the transformed block comprises entropy coding the transformed block in the bitstream. The encoded block is usually reconstructed. Reconstructing a block on the encoder side usually but not necessarily comprises de-quantizing and inverse transforming the de-quantized block to obtain a residual block and adding the predictor to the residual block to obtain a reconstructed block. The reconstructed block may then be used for prediction of other blocks.

Figure 4:
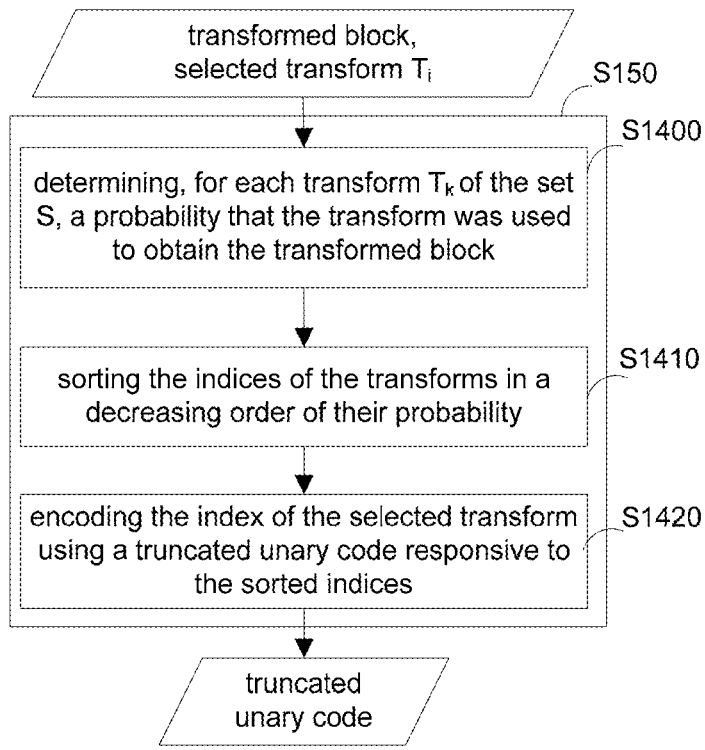

At step S150, the transmitter encodes an index identifying the selected transform. The step S150 is illustrated by FIG. 4. At sub-step S1400, for each transform $T_k$ of the set S, a probability $p_k$ is determined, which is a probability that the transform $T_k$ was used to obtain the transformed block.

In a specific and non-limiting embodiment, the probabilities are determined using a trained Convolutional Neural Network (CNN), i.e. a CNN whose parameters are determined offline on a large set of picture blocks. It will be appreciated, however, that the present principles are not restricted to this specific method for determining the probabilities. Models different from CNN may be used provided they are able to classify the input blocks and gives a probability or class score.

It is common practice to use the wording "class scores" to describe the output of a CNN. We use the term "probability" instead as one may use a softmax loss function in the final layer of CNN which outputs (normalized) probabilities, i.e. values between 0 and 1. It is understood that the invention is not limited to probabilities as defined mathematically, but instead to the more general approach of classification that allows to deduce an order of usage, from the most probable to the least probable, of the transforms $T_k$ or any other coding elements as described above.

At sub-step S1410, the indices of the transforms are sorted in a decreasing order of their probability. At step S1420, the index of the selected transform $T_i$ is encoded using a truncated unary code in response to the sorted list of indices. An example of such truncated unary code is illustrated by table 1.

TABLE 1

| Truncated unary code |
| --- |
| 0 |
| 1 0 |

TABLE 1-continued

| Truncated unary code |
| --- |
| 1 1 0 |
| 1 1 1 0 |
| ... |
| 1 1 1 1 ... 1 0 |
| 1 1 1 1 ... 1 1 |

In an optional step, the truncated unary code may be further encoded using context based arithmetic coding, e.g. CABAC (Context Adaptive Binary Arithmetic Coding). According to the present principles, the CNN output is thus used to drive a truncated unary coder. The truncated unary coder table (e.g. table 2) is re-arranged in a decreasing order of their probability $p_k$ such that the index corresponding to the highest probability is represented by the lowest number of bits and such that the index with the lowest probability is represented by the highest number of bits. Considering N=4, $S=\{T_0, T_1, T_2, T_3\}$ and $T_2$ being the selected transform, the residual block is thus transformed with $T_2$ at step S130. The coefficients of the transformed block possibly quantized are passed through the trained CNN model which outputs for example the following probability values [0.15, 0.1, 0.45, 0.30]. Table 2 shows the truncated unary coder table for the given example. In this case, the original index 2 is well predicted by the CNN model and is therefore coded in the bitstream using a single bit.

TABLE 2

| Transform index | Probabilities | Truncated unary code |
| --- | --- | --- |
| 2 | 0.45 | 0 |
| 3 | 0.3 | 1 0 |
| 0 | 0.15 | 1 1 0 |
| 1 | 0.1 | 1 1 1 |

In another example with N=4, $S=\{T_0, T_1, T_2, T_3\}$ and $T_0$ being the selected transform, the residual block is thus transformed with $T_0$ at step S130. The coefficients of the transformed block possibly quantized are passed through the trained CNN model which outputs for example the following probability values [0.30, 0.1, 0.45, 0.15]. Table 3 shows the truncated unary coder table for the given example. In this case, the original index 0 is coded in the bitstream with 2 bits, namely "10".

TABLE 3

| Transform index | Probabilities | Truncated unary code |
| --- | --- | --- |
| 2 | 0.45 | 0 |
| 0 | 0.3 | 1 0 |
| 3 | 0.15 | 1 1 0 |
| 1 | 0.1 | 1 1 1 |

More generally, for a set S of N transforms, the sorted indices may be stored in a vector v. If the index of the selected transform is equal to v[0] then the index is encoded by a "0", if the index of the selected transform is equal to v[1] then the index is encoded by "10", if the index of the selected transform is equal to v[2] then the index is encoded by "110", . . . , if the index of the selected transform is equal to v[N−2] then the index is encoded by the following series of (N−1) bits "111 . . . 10" and if the index of the selected transform is equal to v[N−1] then the index is encoded by a series of (N−1) bits 1, i.e. "111 . . . 11".

The methods ends at step S180.

Figure 5:
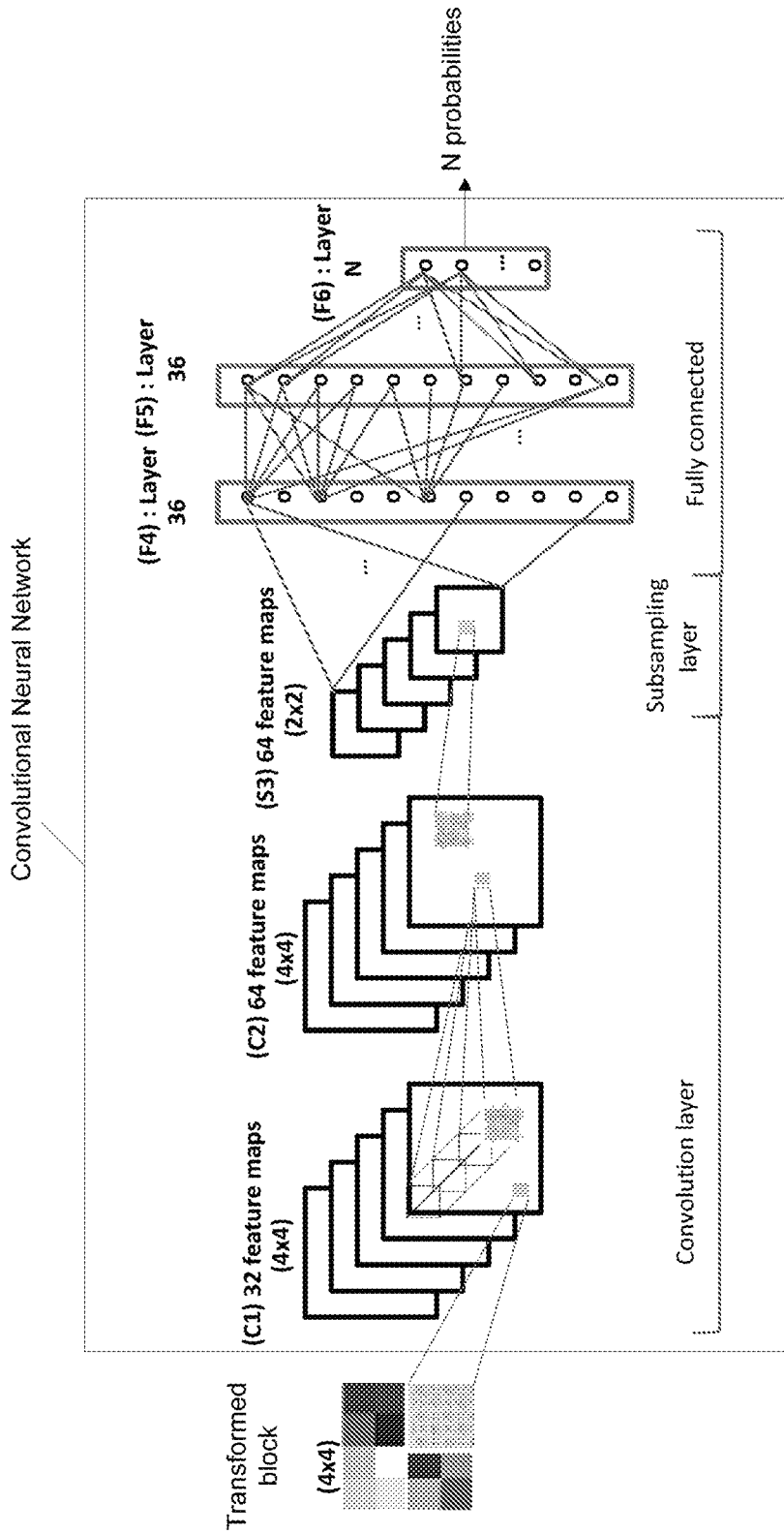
FIG. 5 depicts an example of a Convolutional Neural Network model used according to the present principles.

FIG. 5 depicts an example of a CNN used according to the present principles. It comprises 2 convolutional layers (C1 and C2 on FIG. 5), 1 pooling layer (S3 on FIG. 5) and then followed by 3 fully connected layers (F4, F5 and F6 on FIG. 5). ReLU layers are also used but not represented on FIG. 5. ReLU is the abbreviation of Rectified Linear Units. The first convolutional layer C1 may take as input a transformed (possibly quantized) block of coefficients of size 4×4. It is passed through 32 filters of size 2×2 and a stride of one. The second convolution layer C2 operates over the output of the first layer and uses 64 filters of size 2×2 and a stride of one. A max-pooling layer S3 is used to reduce the size to 2×2×64. This is then fed to the fully connected layers F4 and F5 with 36 perceptrons. The final layer F6 outputs the N probabilities, for instance by using a softmax loss function that provides scores in the form of normalized probabilities.

The convolutional layer is the core building block of a CNN. The layer's parameters consist of a set of learnable filters (or kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the network learns filters that activate when it detects some specific type of feature at some spatial position in the input.

Another important concept of CNNs is pooling, which is a form of non-linear down-sampling. There are several non-linear functions to implement pooling among which max pooling is the most common. It partitions the input image into a set of non-overlapping rectangles and, for each such sub-region, outputs the maximum. ReLU is a layer of neurons that applies the non-saturating activation function f (x)=max (0, x). It increases the nonlinear properties of the decision function and of the overall network without affecting the receptive fields of the convolution layer.

Finally, after several convolutional and max pooling layers, the high-level reasoning in the neural network is done via fully connected layers. Neurons in a fully connected layer have full connections to all activations in the previous layer, as seen in regular Neural Networks. Their activations can hence be computed with a matrix multiplication followed by a bias offset.

The loss layer specifies how the network training penalizes the deviation between the predicted and true labels and is normally the last layer in the network. Various loss functions appropriate for different tasks may be used there. Softmax loss is used for predicting a single class of K mutually exclusive classes.

The CNN model used in step S1400 is trained offline on a large set of transformed (and optionally quantized) blocks. In an exemplary embodiment, the trained CNN is an input of the encoding method illustrated by FIGS. 3, 4 and 6.

Figure 6:
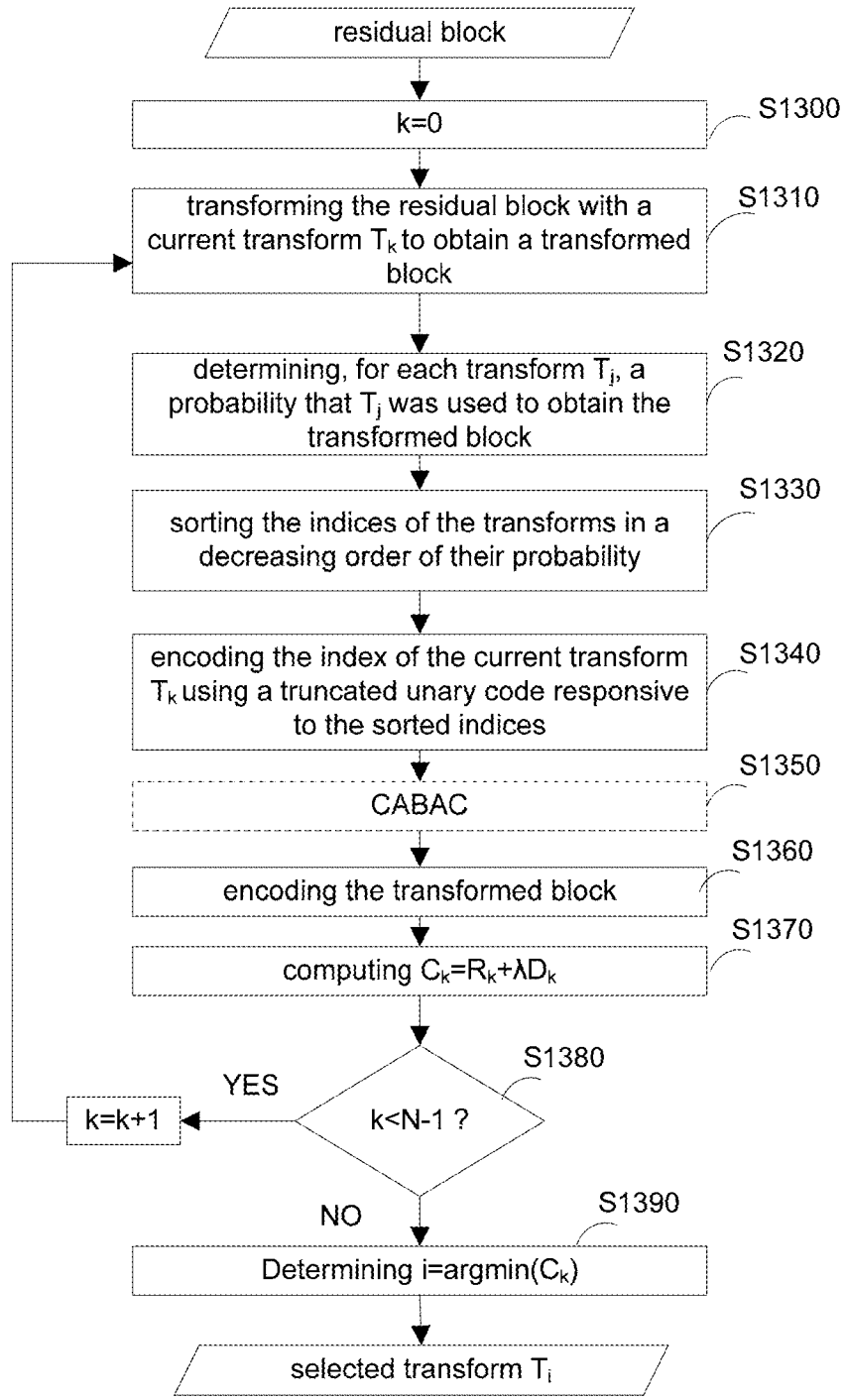
FIG. 6 represents a flowchart of a method for selecting a transform in a set of a plurality of transforms according to specific and non-limiting embodiments.

FIG. 6 represents a flowchart of a method for selecting the transform $T_1$ from the set S according to a specific and non-limiting embodiment. Indeed, the trained CNN model may be used inside an RDO (Rate-Distortion Optimization) loop.

At step S1300, k is set equal to 0. At step S1310, the residual block is transformed with the current transform $T_k$. In an optional step, the transformed block is further quantized.

At step S1320, for each transform $T_j$ of the set S, a probability $p_j$ is determined. As an example, the trained CNN used in step S1400 is used with the residual block transformed by $T_k$ (possibly quantized) as input. At step S1330, the indices of the transforms are sorted in a decreasing order of their probability. The index k identifying the current transform $T_k$ is encoded using a truncated unary code at step S1340. In an optional step S1350, the truncated unary code may be further encoded using context based arithmetic coding, e.g. CABAC. At step S1360, the transformed block (possibly quantized) is entropy coded.

At step S1370, a cost is determined for the current transform $T_k$. The cost $C_k$ is equal to $R_k+\lambda*D_k$, where $R_k$ is the number of bits used when encoding the block with the transform $T_k$, $D_k$ is the distortion of this block, and λ is a Lagrange parameter provided by a user and used to tune the wanted coding quality of the block. $R_k$ takes into account the number of bits used when encoding the index for the transform $T_k$.

At step S1380, it is checked whether k<N−1. In the case where k<N−1, k is incremented by 1 and the method continues at step S1310 with the new value of k. Otherwise (i.e. k=N−1), the method continues at step S1390.

At step 1390, the index i for which the cost $C_i$ is the lowest is determined. The corresponding transform $T_i$ is the transform selected to transform the residual block at step S130.

Figure 7:
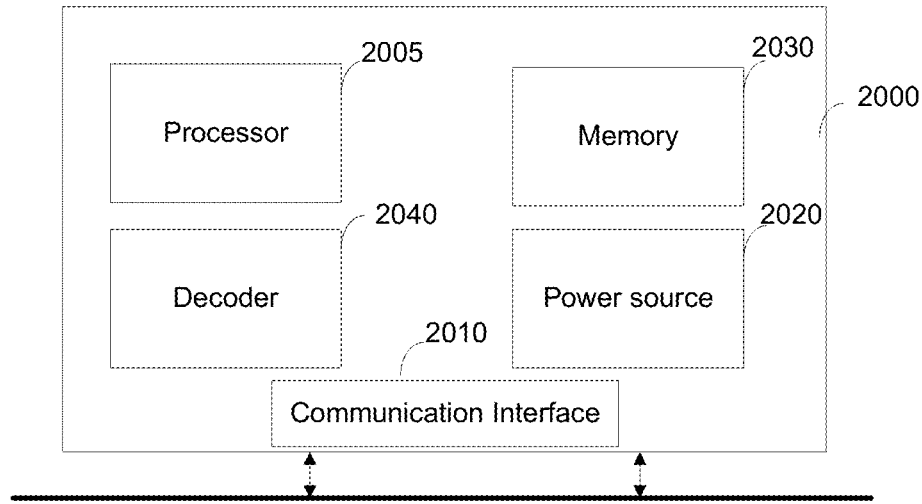
FIG. 7 represents an exemplary architecture of a receiver configured to decode a picture from a bitstream to obtain a decoded picture according to a specific and non-limiting embodiment.

FIG. 7 represents an exemplary architecture of a receiver 2000 configured to decode a picture from a bitstream to obtain a decoded picture according to a specific and non-limiting embodiment.

The receiver 2000 comprises one or more processor(s) 2005, which could comprise, for example, a CPU, a GPU and/or a DSP (English acronym of Digital Signal Processor), along with internal memory 2030 (e.g. RAM, ROM and/or EPROM). The receiver 2000 comprises one or more communication interface(s) 2010 (e.g. a keyboard, a mouse, a touchpad, a webcam), each adapted to display output information and/or allow a user to enter commands and/or data (e.g. the decoded picture); and a power source 2020 which may be external to the receiver 2000. The receiver 2000 may also comprise one or more network interface(s) (not shown). The decoder module 2040 represents the module that may be included in a device to perform the decoding functions. Additionally, the decoder module 2040 may be implemented as a separate element of the receiver 2000 or may be incorporated within processor(s) 2005 as a combination of hardware and software as known to those skilled in the art.

The bitstream may be obtained from a source. According to different embodiments, the source can be, but is not limited to:
  a local memory, e.g. a video memory, a RAM, a flash memory, a hard disk;
  a storage interface, e.g. an interface with a mass storage, a ROM, an optical disc or a magnetic support;
  a communication interface, e.g. a wireline interface (for example a bus interface, a wide area network interface, a local area network interface) or a wireless interface (such as a IEEE 802.11 interface or a Bluetooth interface); and
  an image capturing circuit (e.g. a sensor such as, for example, a CCD (or Charge-Coupled Device) or CMOS (or Complementary Metal-Oxide-Semiconductor)).

According to different embodiments, the decoded picture may be sent to a destination, e.g. a display device. As an example, the decoded picture is stored in a remote or in a local memory, e.g. a video memory or a RAM, a hard disk. In a variant, the decoded picture is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to a specific and non-limiting embodiment, the receiver 2000 further comprises a computer program stored in the memory 2030. The computer program comprises instructions which, when executed by the receiver 2000, in particular by the processor 2005, enable the receiver to execute the decoding method described with reference to FIGS. 9, 10 and 11. According to a variant, the computer program is stored externally to the receiver 2000 on a non-transitory digital data support, e.g. on an external storage medium such as a HDD, CD-ROM, DVD, a read-only and/or DVD drive and/or a DVD Read/Write drive, all known in the art. The receiver 2000 thus comprises a mechanism to read the computer program. Further, the receiver 2000 could access one or more Universal Serial Bus (USB)-type storage devices (e.g., "memory sticks.") through corresponding USB ports (not shown).

According to exemplary and non-limiting embodiments, the receiver 2000 can be, but is not limited to:
a mobile device;
a communication device;
a game device;
a set top box;
a TV set;
a tablet (or tablet computer);
a laptop;
a video player, e.g. a Blu-ray player, a DVD player;
a display and
a decoding chip or decoding device/apparatus.

Figure 8:
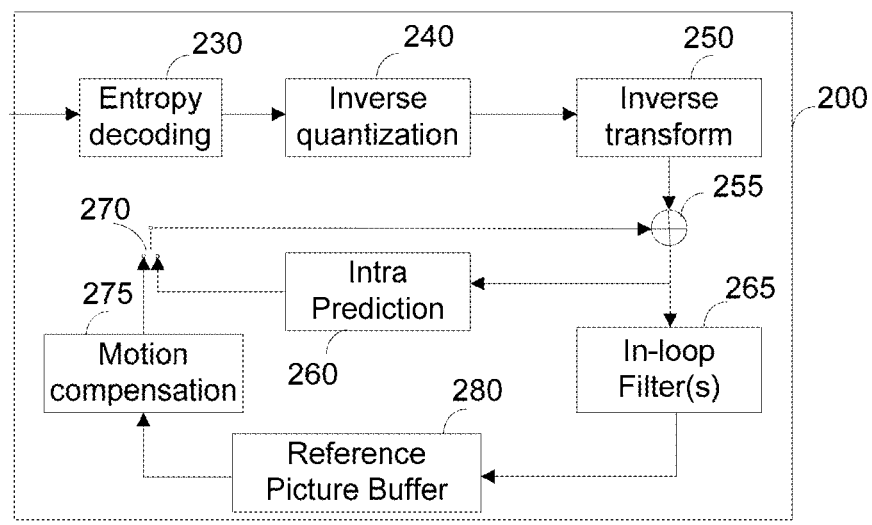
FIG. 8 illustrates a block diagram of an exemplary video decoder.
Figure 9:
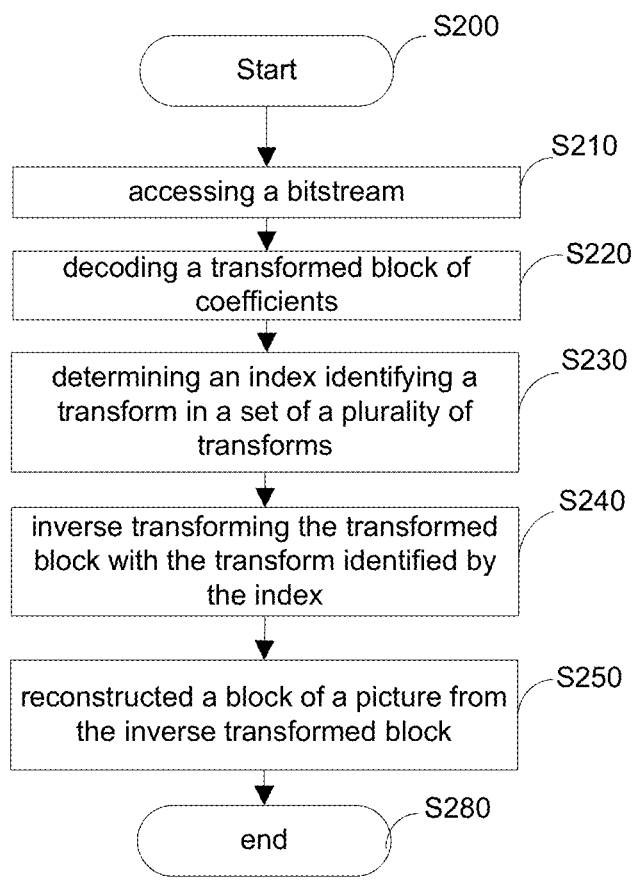
FIGS. 9, 10 and 11 represent flowcharts of a method for decoding a picture block from a bitstream according to specific and non-limiting embodiments.

FIG. 8 illustrates a block diagram of an exemplary video decoder 200, e.g. an HEVC video decoder, adapted to execute the decoding method of FIG. 9. The video decoder 200 is an example of a receiver 2000 or part of such a receiver 2000. In the exemplary decoder 200, a bitstream is decoded by the decoder elements as described below. Video decoder 200 generally performs a decoding pass reciprocal to the encoding pass as described in FIG. 2, which performs video decoding as part of encoding video data.

In particular, the input of the decoder includes a video bitstream, which may be generated by the video encoder 100. The bitstream is first entropy decoded (230) to obtain transform coefficients, motion vectors, and other coded information. The transform coefficients are de-quantized (240) and inverse transformed (250) to decode residuals. The decoded residuals are then combined (255) with a predicted sample block (also known as a predictor) to obtain a decoded/reconstructed picture block. The predicted sample block may be obtained (270) from intra prediction (260) or motion-compensated prediction (i.e., inter prediction) (275). As described above, AMVP and merge mode techniques may be used during motion compensation, which may use interpolation filters to calculate interpolated values for sub-integer samples of a reference block. An in-loop filter (265) is applied to the reconstructed picture. The in-loop filter may comprise a deblocking filter and a SAO filter. The filtered picture is stored at a reference picture buffer (280).

FIG. 9 represents a flowchart of a method for decoding a picture block from a bitstream according to a specific and non-limiting embodiment.

The method starts at step S200. At step S210, a receiver 2000 such as the decoder 2040 accesses a bitstream. At step S220, the receiver decodes a transformed block of coefficients (possibly quantized) from the accessed bitstream. Decoding the transformed block comprises entropy decoding a part of the accessed bitstream.

Figure 10:
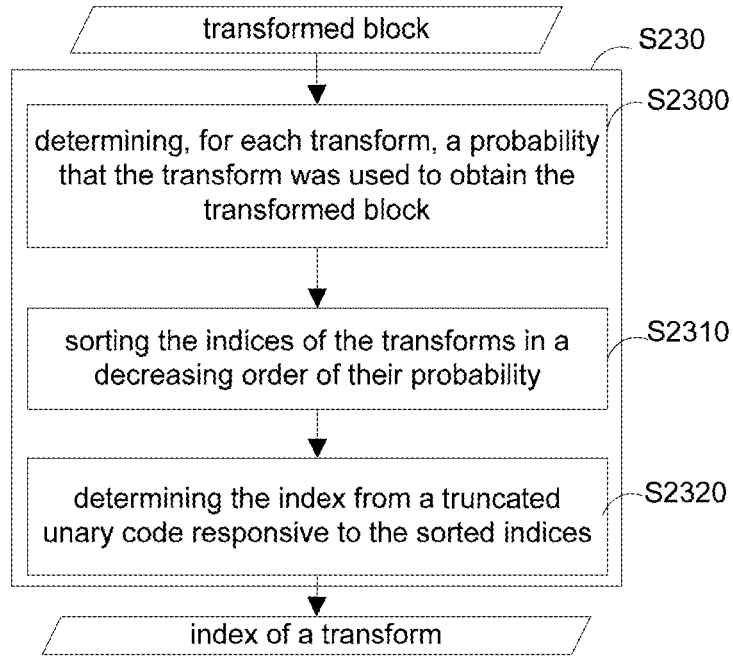

At step S230, the receiver determines an index identifying a transform $T_i$ in a set of a plurality of transforms $S=\{T_k, k \in [0, 1, 2, \ldots, N-1]\}$, N being an integer. The step S230 is illustrated by FIG. 10. At sub-step S2300, for each transform $T_k$ of the set S, a probability $p_k$ is determined, where $p_k$ represents the probability that the transform $T_k$ was used to obtain the transformed block.

In a specific and non-limiting embodiment, the probabilities are determined using a trained Convolutional Neural Network (CNN). The same model as used in step S150 of the encoding method is used herein. At sub-step S2310, the indices of the transforms are sorted in a decreasing order of their probability. The sorted indices may be sorted in a list $v[j], j \in [0, 1, 2, \ldots, N-1]$. Thus v[0] comprises the index of the transform whose probability is the highest and v[N−1] comprises the index of the transform whose probability is the lowest. At sub-step S2320, the index of the transform $T_i$ to be used for reconstructing the block is determined from a truncated unary code in response to the sorted list of indices. The truncated unary code may be obtained directly from the bitstream. In an optional step, the truncated unary code may be further decoded from the bitstream using a context based arithmetic decoder, e.g. a CABAC decoder.

Figure 11:
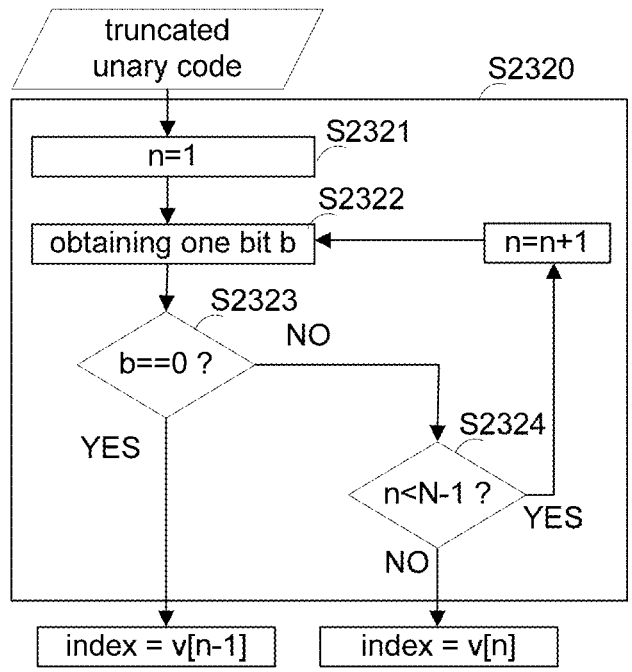

The sub-step S2320 is detailed on FIG. 11. The variable n is initialized to the value 1 at sub-step S2321. At sub-step S2322, one bit b is obtained either directly from the bitstream or from the bitstream after context based arithmetic decoding. At sub-step S2323, it is checked whether the bit b equal to 0. In the case where b is equal to 0 the index is set to the value v[n−1]. In the case where b is equal to 1, it is checked at sub-step S2324 if n<N−1. If n<N−1, then n is incremented by 1 and the method continues at sub-step S2322 with the new value of n. If n=N−1, the index is set to the value v[n].

Considering N=4, the coefficients of the transformed block obtained at step S220 are passed through the trained CNN model to obtain the probabilities [0.15, 0.1, 0.45, 0.30]. Therefore, the indices are stored as follows: v[0]=2, v[1]=3, v[2]=0 and v[3]=1. Indeed, the highest probability 0.45 is obtained for $T_2$ and the lowest probability 0.1 is obtained for $T_1$. If b=0 at the first sub-step S2322, then the index v[0]=2 is determined and thus the transform $T_2$ is used on the decoder side. If b=1 is obtained and then a bit b=0, then the index v[1]=3 is determined and thus the transform $T_3$ is used on the decoder side. If the series of bits "110" is obtained, then the index v[2]=0 is determined and thus the transform $T_0$ is used on the decoder side. Finally, if the series of bits "111" is obtained, then the index v[3]=1 is determined and thus the transform $T_1$ is used on the decoder side At step S240, the transformed block is inverse transformed using the inverse of the transform $(T_i^{-1})$ of S identified by the index determined at step S230. In the case where the transformed block is a quantized block, then the transformed block is inverse quantized before being inverse transformed.

At step S250, a picture block is reconstructed from the inverse transformed block. Reconstructing the picture block comprises adding a predictor to the inverse transformed block. The predictor may be obtained from the same picture (intra prediction) as the picture to which the block belong or from another picture (inter prediction).

The method ends at step S280.
The same variants and embodiments disclosed for the encoding method and encoding device also apply to the decoding method and device.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. An encoding method comprising:
selecting a transform type of a set of a plurality of transform types for a residual block for the picture block and transforming the residual block with the selected transform type into a transformed block comprising a block of transform coefficients,
wherein the selecting comprises determining, for each transform type of the set of the plurality of transform types, a probability that the transform type was used for encoding the picture block, wherein the probability depends on the block of transform coefficients and determining a cost for encoding the picture block associated with each transform type by determining a rate for encoding the index of the transform type based on the determined probabilities;
encoding, in a bitstream, an index identifying the selected transform type based on the determined probabilities;
including the rate for encoding the index of the selected transform type in the cost; and
encoding, in the bitstream, the transformed block.

2. The encoding method according to claim 1, wherein determining, for each transform type of the set of the plurality of transform types, a probability comprises applying a convolutional neural network model on the coefficients of the reconstructed transform block.

3. The encoding method according to claim 1, wherein encoding the index based on the determined probabilities comprises sorting the indices of the plurality of transform types in a decreasing order of their probability to obtain a sorted list of indices, determining a truncated unary code identifying the index in the sorted list of indices and encoding the truncated unary code in the bitstream.

4. An encoding device comprising:
a processor; and
a processor-readable medium comprising instructions operative, when executed by the processor, to cause the encoding device to:
select a transform type of a set of a plurality of transform types for a residual block for the picture block and transforming the residual block with the selected transform type into a transformed block comprising a block of transform coefficients;
wherein the selecting comprises determining, for each transform type of the set of the plurality of transform types, a probability that the transform type was used for encoding the picture block, wherein the probability depends on the block of transform coefficients and determining a cost for encoding the picture block associated with each transform type by determining a rate for encoding the index of the transform type based on the determined probabilities;

encode, in a bitstream, an index identifying the selected transform type based on the determined probabilities;

include the rate for encoding the index of the selected transform type in the cost; and encode, in the bitstream, the transformed block.

5. The encoding device according to claim 4, wherein determining, for each transform type of the set of the plurality of transform types, a probability comprises applying a convolutional neural network model on the coefficients of the reconstructed transformed block.

6. The encoding device according to claim 4, wherein encoding the index based on the determined probabilities comprises:

sorting the indices of the plurality of transform types in a decreasing order of their probability to obtain a sorted list of indices;

determining a truncated unary code identifying the index in the sorted list of indices; and encoding the truncated unary code in the bitstream.

7. The method of claim 1, wherein a cost for a given transform type of the set is based on a number of bits used when encoding a block with the given transform type, a distortion value for the block, and a Lagrange parameter.

8. The method of claim 1, wherein encoding the index further comprises:

sorting the transform types of the set in an ordered list of transform types based on the probabilities determined for the transform types of the set; and encoding the index corresponding to the transform type from the ordered list used to encode the picture block.

9. The encoding device of claim 4, wherein encoding the index further comprises:

sorting the transform types of the set in an ordered list of transform types based on the probabilities determined for the transform types of the set; and encoding the index corresponding to the transform type from the ordered list used to encode the picture block.

10. The method of claim 1, wherein the selected transform type provides a lowest encoding cost for encoding a picture block.

11. The encoding device of claim 4, wherein the selected transform type provides a lowest encoding cost for encoding a picture block.

12. A non-transitory computer-readable storage medium having stored instructions that, when executed by a processor, cause the processor to perform:

selecting a transform type of a set of a plurality of transform types for a residual block for the picture block and transforming the residual block with the selected transform type into a transformed block comprising a block of transform coefficients, wherein the selecting comprises determining, for each transform type of the set of the plurality of transform types, a probability that the transform type was used for encoding the picture block, wherein the probability depends on the block of transform coefficients and determining a cost for encoding the picture block associated with each transform type by determining a rate for encoding the index of the transform type based on the determined probabilities;

encoding, in a bitstream, an index identifying the selected transform type based on the determined probabilities;

including the rate for encoding the index of the selected transform type in the cost; and encoding, in the bitstream, the transformed block.

13. The non-transitory computer-readable storage medium according to claim 12, wherein determining, for each transform type of the set of the plurality of transform types, a probability comprises applying a convolutional neural network model on the coefficients of the reconstructed transform block.

14. The non-transitory computer-readable storage medium according to claim 12, wherein encoding the index based on the determined probabilities comprises sorting the indices of the plurality of transform types in a decreasing order of their probability to obtain a sorted list of indices, determining a truncated unary code identifying the index in the sorted list of indices and encoding the truncated unary code in the bitstream.

15. The non-transitory computer-readable storage medium according to claim 12, wherein a cost for a given transform type of the set is based on a number of bits used when encoding a block with the given transform type, a distortion value for the block, and a Lagrange parameter.

16. The non-transitory computer-readable storage medium according to claim 12, wherein encoding the index further comprises:

sorting the transform types of the set in an ordered list of transform types based on the probabilities determined for the transform types of the set; and encoding the index corresponding to the transform type from the ordered list used to encode the picture block.

17. The non-transitory computer-readable storage medium according to claim 12, wherein the selected transform type provides a lowest encoding cost for encoding a picture block.

* * * * *